United States Patent
Caccavale

(10) Patent No.: US 7,363,657 B2
(45) Date of Patent: Apr. 22, 2008

(54) USING A VIRUS CHECKER IN ONE FILE SERVER TO CHECK FOR VIRUSES IN ANOTHER FILE SERVER

(75) Inventor: Frank S. Caccavale, Hopedale, MA (US)

(73) Assignee: EMC Corporation, Hopkinton, MA (US)

( * ) Notice: Subject to any disclaimer, the term of this patent is extended or adjusted under 35 U.S.C. 154(b) by 1785 days.

(21) Appl. No.: 09/804,320

(22) Filed: Mar. 12, 2001

(65) Prior Publication Data

US 2002/0129277 A1    Sep. 12, 2002

(51) Int. Cl.
*G06F 11/30* (2006.01)
(52) U.S. Cl. .................... 726/24; 726/22; 726/23; 726/25; 713/188; 713/194; 709/224; 709/229
(58) Field of Classification Search ............... 714/38; 713/201, 200, 193–194, 188, 154; 709/232, 709/223–224, 229, 227; 726/22–25
See application file for complete search history.

(56) References Cited

U.S. PATENT DOCUMENTS

| 5,257,381 | A | | 10/1993 | Cook .......................... 719/318 |
| 5,367,698 | A | | 11/1994 | Webber et al. .............. 709/203 |
| 5,475,839 | A | | 12/1995 | Watson et al. ................. 713/2 |
| 5,623,600 | A | * | 4/1997 | Ji et al. ....................... 713/201 |
| 5,893,140 | A | | 4/1999 | Vahalia et al. .............. 711/118 |
| 5,918,008 | A | | 6/1999 | Togawa et al. ............. 713/200 |

(Continued)

OTHER PUBLICATIONS

John Phillips, "Antivirus Scanning Best Practices Guide," [TR3107], Network Appliance, Inc. 495 East Java Drive, Sunnyvale, CA 94089, pp. 1-6; http://www.netapp.com/tech_library/3107.html, dated at least as early as Apr. 12, 2001.

(Continued)

*Primary Examiner*—Thanhnga Truong
(74) *Attorney, Agent, or Firm*—Richard C. Auchterlonie; Novak Druce & Quigg, LLP

(57) ABSTRACT

When a network client accesses a file in a network file server, the network file server invokes a conventional virus checker program in an NT file server to transfer pertinent file data from the network file server to random access memory in the NT file server to perform an anti-virus scan. Users may interact with the virus checker program in the usual fashion, to select file types to check, and actions to perform when a virus is detected. This method eliminates the need for porting the virus checker program to the network file server, and avoids maintenance problems when the virus checker program is updated or upgraded. Moreover, a kernel mode driver in the NT file server may provide an indirect interface to the virus checker program for initiating an anti-virus scan. Therefore, the driver supports a wide variety of virus checker programs and ensures continued operation when the virus checker program is upgraded.

40 Claims, 10 Drawing Sheets

U.S. PATENT DOCUMENTS

| | | | | |
|---|---|---|---|---|
| 5,926,636 | A | * | 7/1999 | Lam et al. .................. 719/313 |
| 5,948,062 | A | * | 9/1999 | Tzelnic et al. .............. 709/219 |
| 5,960,170 | A | * | 9/1999 | Chen et al. .................. 714/38 |
| 6,088,803 | A | | 7/2000 | Tso et al. .................... 713/201 |
| 6,385,727 | B1 | * | 5/2002 | Cassagnol et al. .......... 713/193 |

OTHER PUBLICATIONS

Gerald Foster, *"Desktop Management with Novell ZENworks"*, Chapter 3, The Netware Clients and Related Components, 1st Ed. Apr. 2000, O'Reilly & Associates, Inc. http://www.oreilly.com/catalog/novellzen/chapter/ch03.html, 30 pages.

NT Exam Issues, *"NT Server & Workstation* (Exams 70-067 & -073) Issues" by Ken http://www.ftq.com/notes/nt.html, 17 pages, Feb. 12, 2001.

*Microsoft Press Computer Dictionary*, 3$^{rd}$ eEd., Microsoft Press, a division of Microsoft Corporation, Redmond, Washington, 1997, p. 500.

*Encyclopedia of Computer Science*, Third Edition, 1995 International Thomson Computer Press, Boston, MA, pp. 329-330.

*Network Anti-Virus Solutions* (*Info World*), Aug. 10, 1998 (vol. 20, Issue 32) pp. 1-22, Appearing at http://archive.infoworld.com/cgi-bin/displayArchive.pl?/98/32/virusa.dat.htm, version printed Feb. 23, 2001.

* cited by examiner

| FILE ATTRIBUTES FOR VIRUS CHECKING | | |
|---|---|---|
| BIT 0 | BIT 1 | STATUS |
| 0 | 0 | NOT CHECKED |
| 0 | 1 | CHECKING |
| 1 | 0 | CHECKED - OK |
| 1 | 1 | INFECTED |

*Fig. 4*

USING A VIRUS CHECKER IN ONE FILE SERVER TO CHECK FOR VIRUSES IN ANOTHER FILE SERVER

BACKGROUND OF THE INVENTION

1. Limited Copyright Waiver

A portion of the disclosure of this patent document contains computer code listings to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

2. Field of the Invention

The present invention relates generally to data processing networks, and more particularly to data storage in a data processing network. In particular, the invention relates to using a virus checker in one file server to check for viruses in another file server.

3. Description of Related Art

A computer virus is an intrusive program that infects computer files by inserting in those files copies of itself. When a file containing a virus is executed, the virus may replicate and infect other files, and cause damaging side effects.

As data networks become more open to permit a multiplicity of diverse users to share access to files, the networks are subjected to an increasing threat from viruses. The threat has been addressed by restricting the origin of files to trusted sources, and by using virus checker software to scan the files before the files are executed.

Virus checking software has been installed in a variety of locations within a data network. Users are familiar with virus checking software that runs as a background task on personal computers and workstations. This virus checking software has the disadvantage that it may be disabled or in need of updating to recognize new viruses.

Due to the relative difficulty of maintaining virus checking software on workstations in a network, the virus checkers have been installed in proxy servers and file servers in the network. A proxy server can function as a gatekeeper or filter for files received or transmitted by a group of workstations. A proxy server having a virus checker is an effective means for virus protection for services, such as electronic mail, that are insensitive to transmission delay due to the time that the virus checker needs for scanning the files received or transmitted. The scanning time, however, is relatively long compared to the time for data access in a file server. Therefore, it is often expedient to forego virus checking when accessing a file in a file server. This approach demands that any file contained in the file server must have been scanned for possible viruses before reading from the file. The file server, for example, contains a virus checker utility that scans for viruses. When a user closes a file after any write access to the file, the file is scanned for possible viruses that may have been introduced during the user's write access, before any other user is permitted to open the file. If the virus checker in the file server detects a virus in a file, the file remains locked by the operating system of the file server until the infected file is deleted or disinfected.

There are several difficulties with incorporating a conventional virus checker program into a file server. Conventional virus checkers are written to be loaded and linked with a conventional operating system, such as UNIX or Windows NT. If the file server does not use a conventional operating system, then there will be considerable effort to port the virus checker into the operating system of the file server. In such a case, the provider of the virus checker program may not offer technical assistance or support for the porting effort or maintenance of the virus checker in the environment of the unconventional operating system. In any case, the supplier of the conventional virus checker may demand a license or royalty payment for use of the virus checker program on each file server.

SUMMARY OF THE INVENTION

In accordance with one aspect, the invention provides a method of operation in a data processing system. The data processing system including at least one client, a first file server coupled to the client for data access of the client to at least one file in the first file server, and at least a second file server coupled to the first file server for data access of the second file server to the file in the first file server. The second file server is programmed with a virus checker program. The virus checker program is executable by the second file server to perform an anti-virus scan upon file data in random access memory of the second file server. The method includes the first file server responding to a request for access from the client to the file in the first file server by determining that an anti-virus scan of the file should be performed, and initiating the anti-virus scan of the file by sending to the second file server a request for the anti-virus scan including a specification of the file. Then the second file server responds to the request for the anti-virus scan by invoking the virus checker program to perform an anti-virus scan of the specified file by obtaining file data of the file from the first file server and storing the file data of the file into the random access memory of the second file server and performing the anti-virus scan upon the file data of the file in the random access memory.

In accordance with another aspect, the invention provides a method of operating a network file server to initiate a virus scan upon a file stored in the network file server. The network file server is coupled to at least one client for access of the client to at least one file in the network file server, and the network file server is coupled to a plurality of secondary servers for access of the secondary servers to the file stored in the network file server. The network file server includes a cached disk array and a plurality of data mover computers coupled to the data network and coupled to the cached disk array for responding to client requests for data access to storage in the cached disk array. Each secondary server is programmed with a virus checker program executable for performing an anti-virus scan upon file data in random access memory of the secondary server. The method includes at least one of the data movers in the network file server responding to a request for access from the client to the file in the network file server by applying a filter upon a file extension of the file upon opening or closing of the file to determine that an anti-virus scan of the file should be performed, and initiating the anti-virus scan of the file by applying a load balancing procedure for selecting one of the secondary servers for performing the anti-virus scan of the file, and sending to the selected secondary server a request for the anti-virus scan including a specification of the file. Then the selected secondary server responds to the request for the anti-virus scan by invoking the virus checker program in the selected secondary server to perform an anti-virus scan of the specified file by obtaining file data of the file from the network file server and storing the file data of the file into the random access memory of the selected secondary server and performing the anti-virus scan upon the file data of the file in the random access memory of the selected secondary server.

In accordance with yet another aspect, the invention provides a method of operation in a data network including a first server and a second server. The second server is coupled by the data network to the first server for access of the second server to at least one file stored in the first server. The second server is programmed with an operating system supporting processes executing in a user mode and processes executing in a kernel mode. The operating system of the second server includes an input/output manager executing in the kernel mode. The method is a way of operating the second server to perform an anti-virus scan upon the file in the first server. A server for virus checking executes in the second server in the user mode. The server for virus checking receives from the network a request for the anti-virus scan upon the file. Then the server for virus checking forwards the request to a virus checker initiator driver executing in the second server in the kernel mode, and the virus checker initiator driver responds to receipt of the request by sending a file access call to the input/output manager. Then the input/output manager responds to the file access call by reporting the file access event to a virus checker program executing in the second server in the user mode, and the virus checker program responds by obtaining file data from the file in the first server and storing the file data in random access memory in the second server, and performing an anti-virus scan upon the file data in the random access memory in the second server.

In accordance with another aspect, the invention provides a method of operation of a data mover in a network file server. The network file server is in a data processing system that further includes at least one client coupled to the network file server by a data network for access of the client to at least one file in the network file server, and a plurality of NT file servers coupled to the network file server by the data network for data access of the NT file servers to the file in the network file server. The network file server includes a cached disk array and a plurality of data mover computers coupled to the data network and coupled to the cached disk array for responding to client requests for data access to storage in the cached disk array. Each of the NT file servers is programmed with a virus checker program that is executable by the NT file server to perform an anti-virus scan upon file data in random access memory of the NT file server. The method includes the data mover in the network file server responding to a request from the client for access to the file in the network file server by applying a filter upon a file extension of the file upon opening or closing of the file to determine that an anti-virus scan of the file should be performed, and initiating the anti-virus scan of the file by selecting a next one of the NT file servers in round-robin fashion and sending to the selected NT file server a request for the anti-virus scan including a specification of the file. Then the selected NT file server responds to the request for the anti-virus scan by invoking the virus checker program in the selected NT file server to perform an anti-virus scan of the specified file by obtaining file data of the file from the network file server and storing the file data of the file in the random access memory of the selected NT file server and performing the anti-virus scan upon the file data of the file in the random access memory of the selected NT file server.

In accordance with yet another aspect, the invention provides a data processing system. The data processing system includes at least one client, a first file server coupled to the client for access of the client to at least one file in the first file server, and at least a second file server coupled to the first file server for data access of the second file server to the file in the first file server. The second file server is programmed with a virus checker program. The virus checker program is executable by the second file server to perform an anti-virus scan upon file data in random access memory of the second file server. The first file server is programmed to respond to a request from the client for access to the file in the first file server by determining that an anti-virus scan of the file should be performed, and initiating the anti-virus scan of the file by sending to the second file server a request for the anti-virus scan including a specification of the file. The second file server is programmed to respond to the request for the anti-virus scan by invoking the virus checker program to perform an anti-virus scan of the specified file by obtaining file data of the file from the first file server and storing the file data of the file in the random access memory of the second file server and performing the anti-virus scan upon the file data in the random access memory.

In accordance with another aspect, the invention provides a network file server. The network file server is adapted for coupling to at least one client for access of the client to at least one file in the network file server. The network file server is also adapted for coupling to a plurality of secondary servers for access of the secondary servers to the file stored in the network file server. Each secondary server is programmed with a virus checker program executable for transferring file data from the file in the network file server to random access memory in the secondary server, and performing an anti-virus scan upon the file data in the random access memory of the secondary server. The network file server includes a cached disk array, and a plurality of data mover computers coupled to the data network and coupled to the cached disk array for responding to client requests for data access to storage in the cached disk array. At least one of the data movers is programmed to respond to a request from the client for access to the file in the network file server by applying a filter upon a file extension of the file upon opening or closing of the file to determine that an anti-virus scan of the file should be performed, and initiating the anti-virus scan of the file by applying a load balancing procedure for selecting one of the secondary servers for performing the anti-virus scan of the file, and sending to the selected secondary server a request for the anti-virus scan including a specification of the file.

In accordance with still another aspect, the invention provides a secondary server adapted for coupling to a primary server in a data network for access to data in files in the primary server. The secondary server is programmed with an operating system supporting processes executing in a user mode and processes executing in a kernel mode. The operating system includes an input/output manager executable in the kernel mode. The secondary server is further programmed with a server for virus checking executable in the user mode, a virus checking driver executable in the kernel mode, and a virus checker program executable in the user mode. The server for virus checking is executable for receiving from the network a request for an anti-virus scan upon a specified file in the primary server, and for forwarding the request to the virus checker initiator driver. The virus checker initiator driver is executable for responding to receipt of the request from the server for virus checking by placing a file access call to the input/output manager for access of the specified file. The input/output manager is executable for responding to the file access call by reporting a file access event upon the specified file to the virus checker program. The virus checker program is executable for responding to the report of the file access event by transferring file data from the specified file in the primary server to random access memory in the secondary server, and performing an anti-virus scan upon the file data in the random access memory in the secondary server.

In accordance with another aspect, the invention provides a data processing system including at least one client, at least one network file server coupled to the client by a data network for access of the client to at least one file in the network file server, and a plurality of NT file servers coupled to the network file server by the data network for data access of the NT file servers to the file in the network file server. The network file server includes a cached disk array and a plurality of data mover computers coupled to the data network and coupled to the cached disk array for responding to client requests for data access to storage in the cached disk array. Each of the NT file servers is programmed with a virus checker program that is executable by the NT file server to perform an anti-virus scan upon file data in random access memory of the NT file server. At least one data mover in the network file server is programmed for responding to a request from the client for access to the file in the network file server by applying a filter upon a file extension of the file upon opening or closing of the file to determine that an anti-virus scan of the file should be performed, and initiating the anti-virus scan of the file by selecting a next one of the NT file servers in round-robin fashion and sending to the selected NT file server a request for the anti-virus scan including a specification of the file. Each NT file server is programmed to respond to the request for the anti-virus scan by invoking the virus checker program in the NT file server to perform an anti-virus scan of the specified file by obtaining file data of the specified file from the network file server and storing the file data of the specified file in the random access memory of the NT file server and performing the anti-virus scan upon the file data of the specified file in the random access memory of the NT file server.

In accordance with yet another aspect, the invention provides a program storage device containing a program executable by a network file server. The network file server is adapted for coupling to at least one client for access of the client to at least one file in the network file server. The network file server is also adapted for coupling to a plurality of secondary servers for access of the secondary servers to the file stored in the network file server. The secondary server is programmed with a virus checker program executable for transferring file data from the file in the network file server to random access memory in the secondary server, and performing an anti-virus scan upon the file data in the random access memory of the secondary server. The program contained in the program storage device is executable by the network file server for responding to a request from the client for access to the file in the network file server by applying a filter upon a file extension of the file upon opening or closing of the file to determine that an anti-virus scan of the file should be performed, and initiating the anti-virus scan of the file by applying a load balancing procedure for selecting one of the secondary servers for performing the anti-virus scan of the file, and sending to the selected secondary server a request for the anti-virus scan including a specification of the file.

In accordance with a final aspect, the invention provides a program storage device containing a program executable by a secondary server. The secondary server is adapted for coupling to a primary server in a data network for access to data in files in the primary server. The secondary server is programmable with an operating system supporting processes executing in a user mode and processes executing in a kernel mode. The operating system includes an input/output manager executable in the kernel mode. The secondary server is also programmable with a virus checker program for performing an anti-virus scan upon file data in response to a file opening event being reported to the input/output manager. The program contained in the program storage device includes a server for virus checking executable in the user mode, and a virus checking driver executable in the kernel mode. The server for virus checking is executable for receiving from the network a request for the anti-virus scan upon a specified file in the primary server, and for forwarding the request to the virus checker initiator driver. The virus checker initiator driver is executable for responding to receipt of the request from the server for virus checking by sending a file access call upon the specified file to the input/output manager. The input/output manager responds to the file access call by sending a report of a file access event upon the specified file to the virus checker program to initiate an anti-virus scan upon file data of the specified file.

BRIEF DESCRIPTION OF THE DRAWINGS

Other objects and advantages of the invention will become apparent upon reading the detailed description with reference to the drawings, in which:

FIG. 4 is a table showing how two file attribute bits encode virus checking status for a file in the network file server in FIG. 1;

Figure 1:
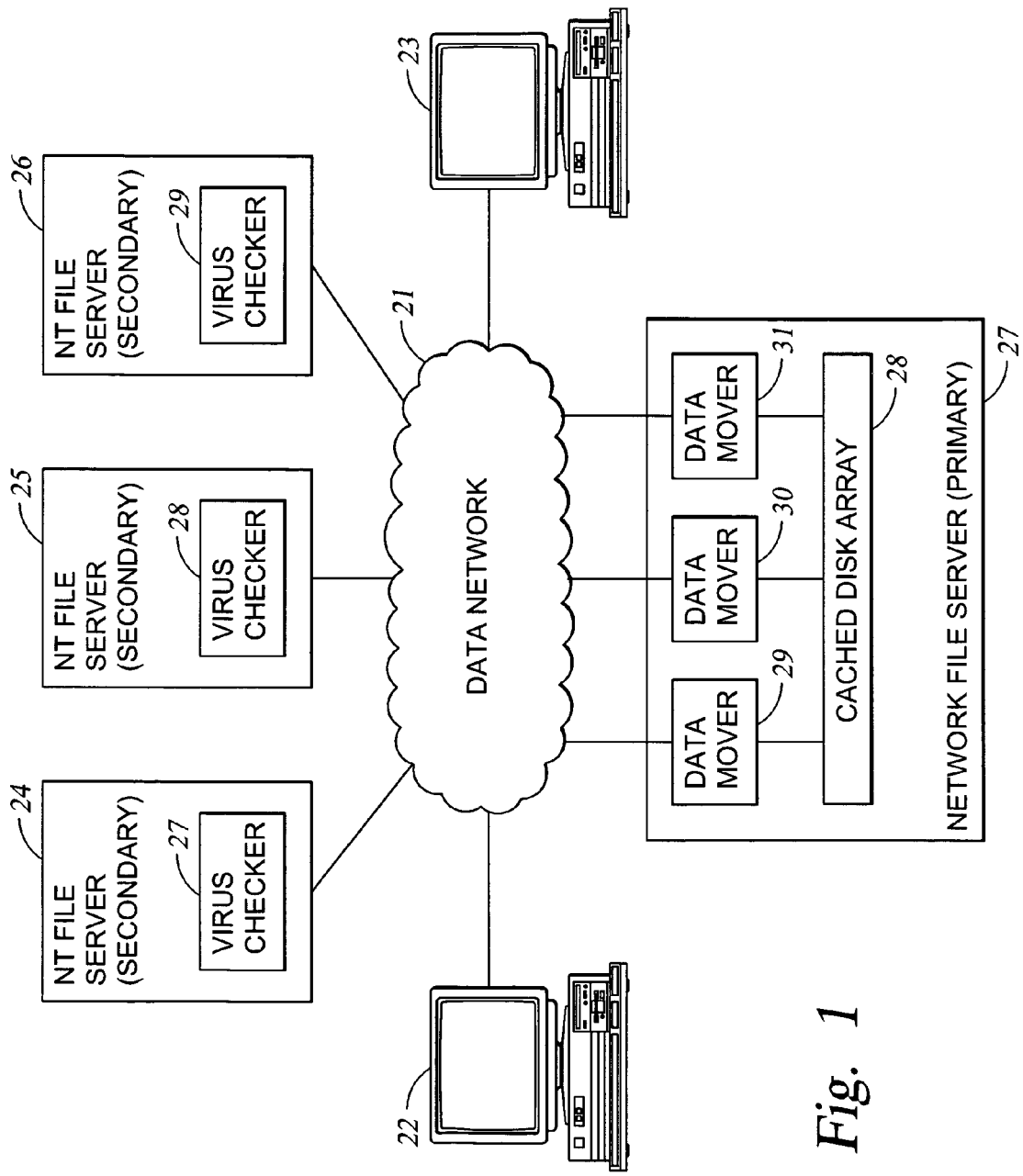
FIG. 1 shows a block diagram of a data processing system incorporating the present invention.

While the invention is susceptible to various modifications and alternative forms, a specific embodiment thereof has been shown by way of example in the drawings and will be described in detail. It should be understood, however, that it is not intended to limit the form of the invention to the particular form shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a data processing system incorporating the present invention. The data processing system includes a data network 21 interconnecting a number of clients and servers. The data network 21 may include any one or more of network connection technologies, such as Ethernet or Fibre Channel, and communication protocols, such as TCP/IP or UDP. The clients include work stations 22 and 23. The work stations, for example, are personal computers. The servers include conventional Windows NT/2000 file servers 24, 25, 26, and a very large capacity network file server 27. The network file server 27 functions as a primary server storing files in nonvolatile memory. The NT file servers 24, 25, 26 serve as secondary servers performing virus checking upon file data obtained from the network file server 27. The network file server 27 is further described in Vahalia et al., U.S. Pat. No. 5,893,140 issued Apr. 6, 1999, incorporated herein by reference. Such a very large capacity network file server 27 is manufactured and sold by EMC Corporation, 35 Parkwood Dr., Hopkinton, Mass. 01748.

The network file server 27 includes a cached disk array 28 and a number of data movers 29, 30 and 31. The network file server 27 is managed as a dedicated network appliance, integrated with popular network operating systems in a way, which, other than its superior performance, is transparent to the end user. The clustering of the data movers 29, 30, 31 as a front end to the cached disk array 28 provides parallelism and scalability. Each of the data movers 29, 30, 31 is a high-end commodity computer, providing the highest performance appropriate for a data mover at the lowest cost. Although the data mover computers 29, 30, and 31 may communicate with the other network devices using standard file access protocols such as the Network File System (NFS) or the Common Internet File System (CIFS) protocols, the data mover computers do not necessarily employ standard operating systems. For example, the network file server 27 is programmed with a Unix-based file system that has been adapted for rapid file access and streaming of data between the cached disk array 28 and the data network 21 by any one of the data mover computers 29, 30, 31.

Each of the NT file servers 24, 25, 26 is programmed with a respective conventional virus checker 27, 28, 29. The virus checkers are enterprise class anti-virus engines, such as the NAI/McAfee's NetShield 4.5 for NT Server, Symantec Norton AntiVirus 7.5 Corporate Edition for Windows NT, Trend Micro's ServerProtect 5.5 for Windows NT Server. In each of the NT file servers 24, 25, 26, the virus checker 27, 28, 29 is invoked to scan a file in the file server in response to certain file access operations. For example, when the file is opened for a user, the file is scanned prior to access by the user, and when the file is closed, the file is scanned before permitting any other user to access the file.

The network file server 27, however, is not programmed with a conventional virus checker, because a conventional virus checker needs to run in the environment of a conventional operating system. Network administrators, who are the purchasers of the file servers, would like the network file server 27 to have a virus checking capability similar to the virus checking provided in the conventional NT file servers 24, 25, 26. Although a conventional virus checker could be modified to run in the environment of the data mover operating system, or the data mover operating system could be modified to support a conventional virus checker, the present invention provides a way for the network file server 27 to use the virus checkers 27, 28, 29 in the NT file servers to check files in the network file server 27 in response to user access of the files in the network file server. This avoids the difficulties of porting a conventional virus checker to the network file server, and maintaining a conventional virus checker in the data mover environment of the network file server. Moreover, in many cases, the high-capacity network file server 27 is added to an existing data processing system that already includes one or more NT file servers including conventional virus checkers. In such a system, all of the files in the NT file servers 24, 25, 26 can be migrated to the high-capacity network file server 27 in order to facilitate storage management. The NT file servers 24, 25, 26 in effect become obsolete for data storage, yet they can still serve a useful function by providing virus checking services to the network file server.

In general, when a client 22, 23 stores or modifies a file in the network file server 27, the network file server determines when the file needs to be scanned. When anti-virus scanning of a file has begun, other clients are blocked on any access to that file, until the scan completes on the file. The network file server 27 selects a particular one of the NT file servers 24, 25, 26 to perform the scan, in order to balance loading upon the NT file servers for anti-virus scanning processes. The virus checker in the selected NT file server performs a read-only access of the file to transfer file data from the network file server to random access memory in the selected NT file server in order to perform the anti-virus scan in the NT file server.

Typically the anti-virus scan is a search for certain patterns of known viruses. Another method, applicable to read-only files, is to maintain a separate registry of hashings computed from the file contents when the files were known to be devoid of any viruses. In this alternative method, the anti-virus scan computes a hashing of the file content, and compares the hashing to the hashing in the registry. If the computed hashing does not match the hashing in the registry, the file is indicated as infected. In any case, the result of the scan, indicating whether the file is found to be infected or not, is returned from the virus checker in the NT file server to the network file server 27. If the file is indicated as infected, then the network file server blocks any further access of the client to the file in the network file server.

Figure 2:
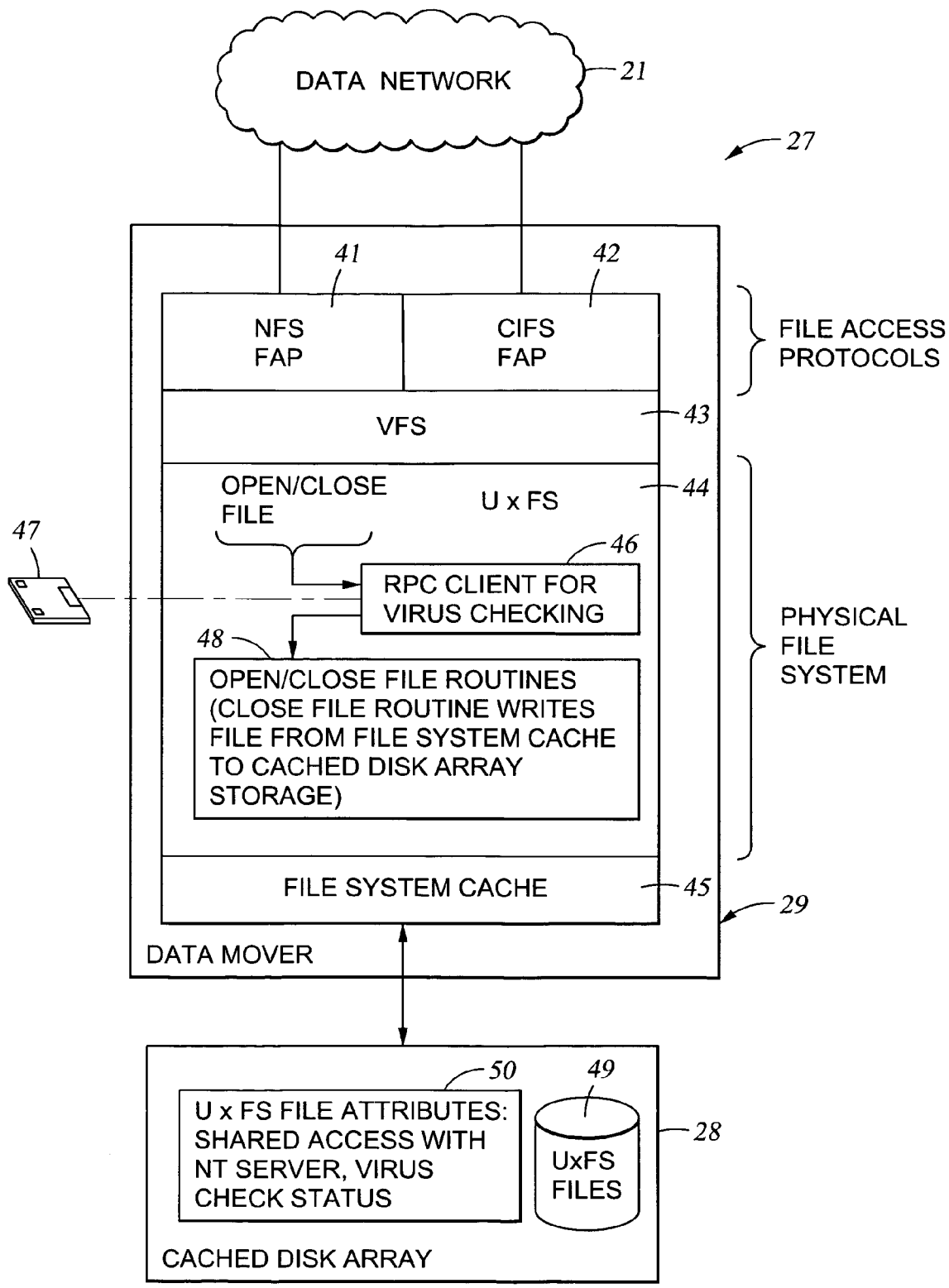
FIG. 2 is a block diagram of the cached disk array and one of the data movers in the network file server of FIG. 1.

Referring to FIG. 2, there is shown a block diagram of software structure that is replicated in each data mover. The software structure includes modules 41 and 42 for the Network File System (NFS) file access protocol (FAP) and the Common Internet File System (CIFS) file access protocol, a Virtual File System (VFS) 43, and a Unix-based file system (UxFS). The Virtual File System (VFS), which is an industry-standard backend file system switch, interfaces with the UxFS physical file system 44. VFS translates NFS Common File System requests. (The NFS Common File System Requests in themselves are translations of NFS requests to the intended physical file storage devices.) UxFS accesses a file system buffer cache 45 during data transfers between the data network 21 and disk storage in the cached disk array 28.

In accordance with an aspect of the present invention, a Remote Procedure Call (RPC) client for virus checking 46 is integrated with the UxFS module 44. For example, the UxFS module 44, including the RPC client for virus checking 46, is read from a machine readable program storage device such as a floppy disk 47, and loaded into data storage of the data mover 29. The RPC client for virus checking 46 is invoked directly or indirectly to initiate an anti-virus scan of a specified file. For example, as further described below with reference to FIGS. 6 and 7, the RPC client for virus checking 46 is invoked indirectly when a client attempts to open a file that has not been checked for viruses, and when a client closes a file after a write operation that creates or modifies the file. In this case, the RPC client for virus checking 46 intercepts calls originally intended for the open and close file routines 48 in the UxFS 44.

Upon closing of a file after a write operation, the new file data is written down from the file system cache 45 to the UxFS files 49 in the cached disk array 28. The cached disk array 28 also stores UxFS file attributes 50. For virus checking, the file attributes indicate that the files to be checked have shared access with the NT servers, so that the virus checkers in the NT servers may share access to the files. The file attributes also include virus check status. The RPC client for virus checking maintains the virus check status as further described below with reference to FIGS. 4 and 5.

Figure 3:
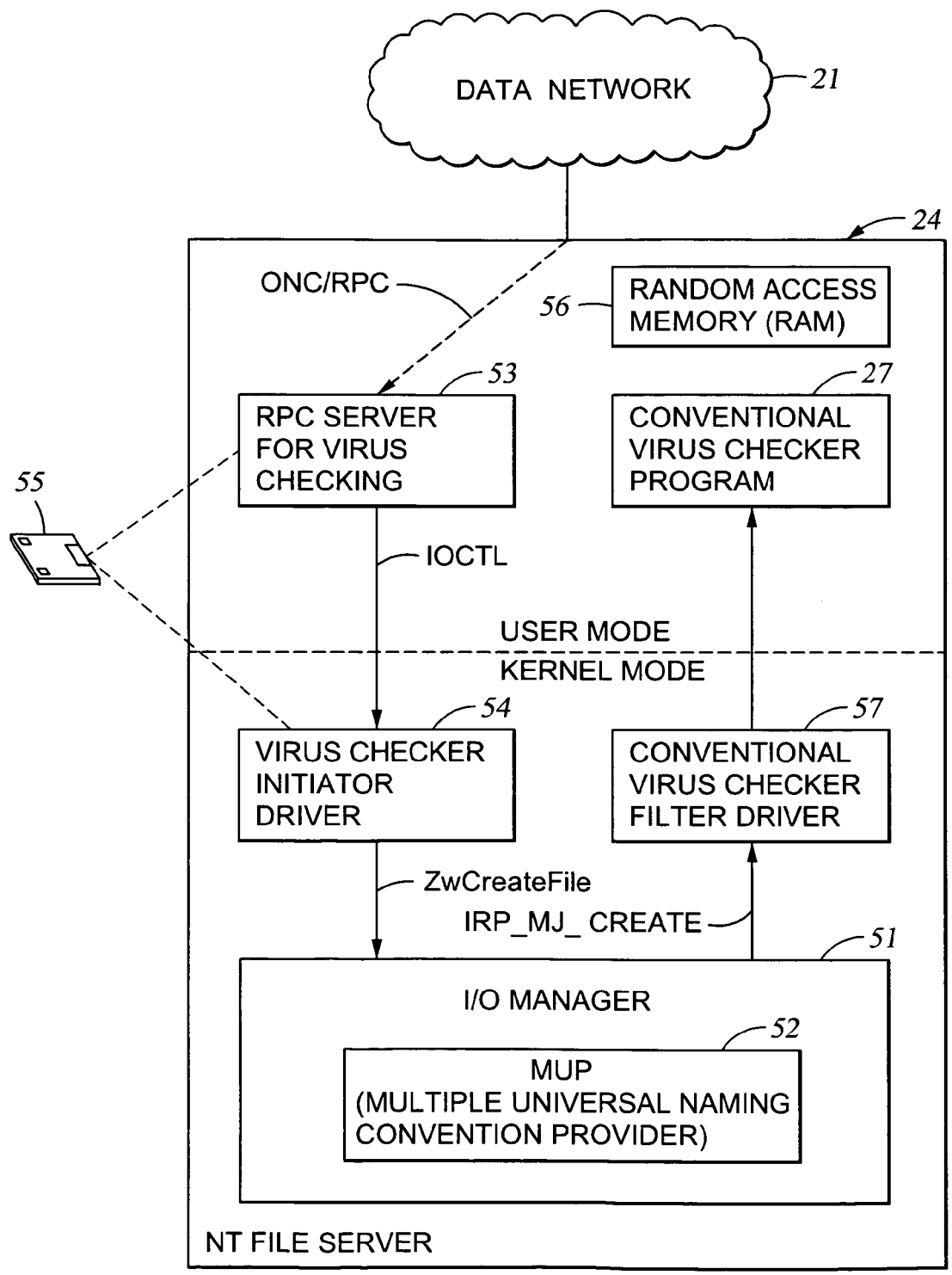
FIG. 3 is a block diagram of one of the NT file servers in the data processing system of FIG. 1.

FIG. 3 shows components in the NT file server 24. The Windows NT/2000 operating system includes an input/output (IO) manager 51, including a Multiple Universal Naming Convention Provider (MUP) 52. The MUP 52 resolves the pathnames of objects such as clients, servers, and files in the data processing system of FIG. 1. As described with respect to FIGS. 1 and 2, when the RPC client for virus checking 46 in the network file server 27 determines that an anti-virus scan of a file is needed, the RPC client for virus checking sends a request to the conventional virus checker program 27 of the NT file server. However, the conventional virus checker program 27 typically is not programmed to receive a request from a source external to the NT file server 24. Even if the conventional virus checker program 27 were programmed to receive such an external request, it may be undesirable for the network file server to directly invoke the conventional virus checker program because the conventional virus checker program might be upgraded in such a way that the upgraded virus checker program would fail to recognize the external request.

What is desired is a way of stimulating the operating system of the NT file server to cause the conventional virus checker program to check an external file. Therefore, if the conventional virus checker program were upgraded in a fashion compatible with the Windows NT/2000 operating system, the upgraded virus checker program would continue to be invoked by the RPC client for virus checking in the network file server. To accomplish this task, the NT file server is programmed with a RPC server for virus checking 53 that executes in user mode, and a virus checker initiator driver 54 that executes in kernel mode. The RPC server for virus checking 53 and the virus checker initiator driver 54 are loaded into the NT file server 24 from a programmed storage device such as the floppy disk 55. The RPC server for virus checking 53 responds to an Open Network Computing (ONC) Remote Procedure Call (RPC) from the RPC client for virus checking in the network file server. In particular, the I/O manager 51 receives the ONC/RPC requests from the data network 21, and the MUP 52 directs the request to the RPC server for virus checking 53. The ONC/RPC request includes a path specification for the file to be checked. The path specification includes the file name in accordance with the Universal Naming Convention (UNC). Such a path specification looks like \\servername\sharename\path\file. The RPC server for virus checking sends an input/output control command (IOCTL) and the path specification to the virus checker initiator driver 54. The virus checker initiator driver 54 responds by sending a file opening call for the file in the form of ZwCreateFile to the I/O manager 51. The file opening call includes the path specification for the file. The conventional virus checker program 27 is registered with the I/O manager 51 to receive a report of such a file opening event, and to return a condition code indicating success or failure of an anti-virus scan upon the specified file. The I/O manager 51 responds to the file opening call by sending a report of the file opening event to the conventional virus checker program 27. In particular, the I/O manager 51 sends an IRP_MJ_CREATE command and the ONC path specification to a conventional virus checker filter driver 57, which forwards the report of the file opening event to the conventional virus checker program 27. In response to the report of the file opening event, the conventional virus checker program 27 performs an anti-virus scan upon the specified file in the network file server.

The conventional virus checker program performs the anti-virus scan by performing a read-only access upon the file to transfer file data to random access memory (RAM) 56 in the NT file server, and to scan the file data in the RAM of the NT file server. The ONC/RPC file checking request sent to the NT file server includes the name of the file but not the content of the file. The conventional virus checker program running on the NT file server has the responsibility of employing its heuristics to determine the appropriate parts of the file to bring across to the NT file server for scanning purposes. This renders the scans of most file types highly efficient. (The worst case scenario is a scan of a compressed or zip type file.) The conventional virus checker program 27 then returns the condition code to the I/O manager 51. The I/O manager 51, the virus checker initiator driver 54, and the RPC server for virus checking 53 in sequence return the condition code to the RPC client for virus checking in the network file server.

It should be apparent that each file in the network file server (27 in FIGS. 1 and 2) has a particular status with respect to virus checking. For example, virus checking may never have been performed upon the file, checking could have been begun for the file, the file may have been checked and found to be ok as far as the virus checker can determine, or the file could have been checked and found to be infected with a virus. The present virus checking status of a file could be indicated by two file attribute bits, as shown in FIG. 4. These attribute bits, for example, are stored in the UxFS file attributes (50 in FIG. 2) in the cached disk array (28 in FIG. 2). By storing the file attribute bits in the cached disk array, they are preserved for diagnostic and recovery purposes in the event of a system crash. Moreover, each of the data movers in the network file server may have access to these file attribute bits so that each of the data movers could control file access and virus checking for any one of the UxFS files.

An alternative to using file attributes bits for storing virus check status is to maintain respective lists or caches of file names for the most infrequent file status. For example, if files are virus checked before they are ever stored on the network file server, then under normal conditions, only a small number of files should ever be in the unchecked, scanning, or infected states. In this case it is desirable to keep, in battery-backed random access memory, at least the cache of the file names of files that are in the process of being scanned. If a loss of line power occurs, the content of the battery-backed random access memory is written to a disk drive to preserve the data before any loss of battery power.

Figure 5:
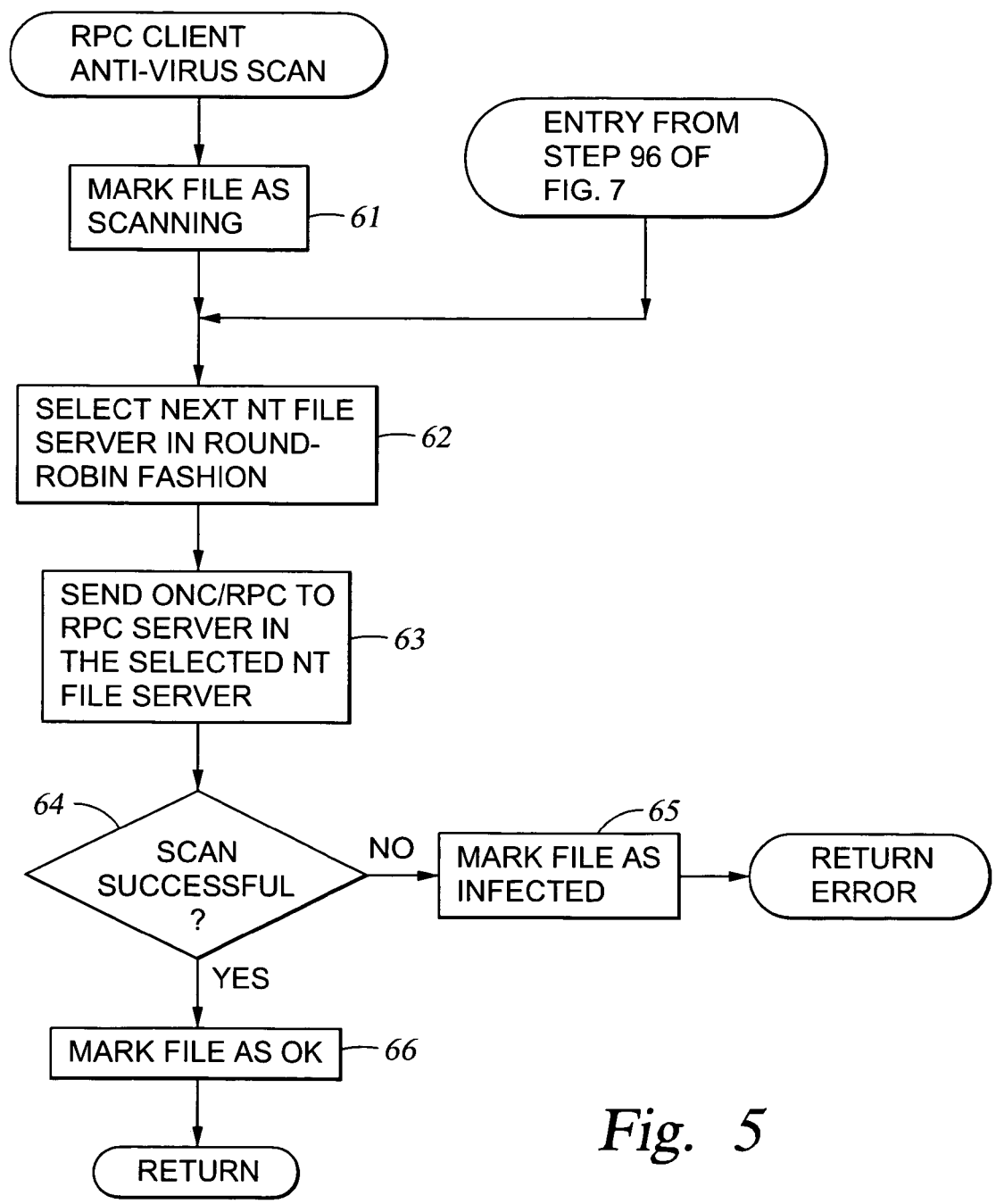
FIG. 5 is a flowchart of a subroutine in an RPC client for virus checking in the data mover of FIG. 2.

With reference to FIG. 5, there is shown a flow chart of an anti-virus scan procedure performed by the RPC client for virus checking (46 in FIG. 2). In the first step 61 of FIG. 5, the RPC client marks the file status as "scanning." Then in step 62, the RPC client selects a next one of the NT file servers in round-robin fashion in order to balance loading of file scan requests upon the NT file servers. In other words, for the case of a number (N) of NT file servers, the data mover maintains an index ranging from 0 to N-1 indicating the last one of the NT file servers to receive an anti-virus scan request from the data mover. The RPC client increments this index, and sets it to 0 if it is greater or equal to N. This value is used as the index for selecting the next NT file server in round-robin fashion.

In a preferred implementation, the RPC client for virus checking is multi-threaded and supports configurable parameters that set and affect how the RPC client behaves. For example, multiple file checking requests can be queued for transmission to the NT file servers. In this case, if a file checking request has already been assigned to the next NT file server, then the index will be advanced to the next NT file server that does not have an outstanding file checking request assigned to it by the data mover. If all of the NT file servers have outstanding file checking requests, then up to a predetermined number of outstanding requests from the data mover will be assigned and transmitted to the NT file servers. For example, in step 62 the name of the file to be checked is placed on a queue that is serviced by a pool of threads. Each thread dispatches a request to an assigned NT file server and waits for a reply. After the reply is received and process, the thread is again available for servicing the queue. The number of threads in the pool is configurable and has a default value of twenty. The queue of file names indicates the files having the checking status.

In step 63, the RPC client (and more particularly, in the preferred implementation, a thread from the pool) sends an ONC/RPC to the RPC server for virus checking in the selected NT file server. In step 64, the RPC client inspects the reply from the RPC server. If the reply indicates that the scan was not successful, then the file attribute bits for scanning are set to mark the file as infected in step 65, and the RPC client returns and error code to the calling routine. Otherwise, if the scan was successful, execution continues from step 64 to step 66 to mark the file as ok, and execution returns to the calling routine.

Figure 6:
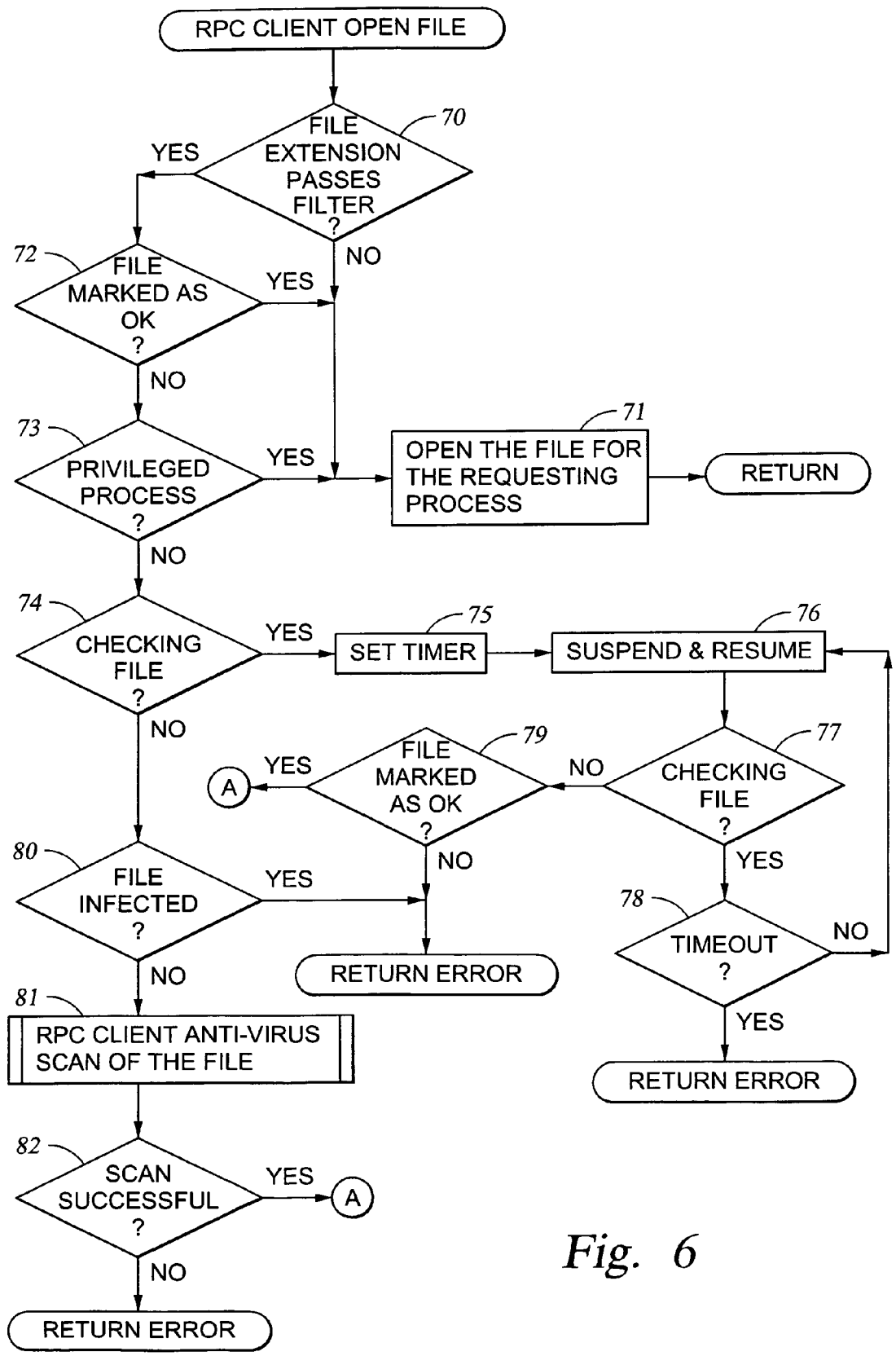
FIG. 6 is a flowchart of a subroutine of the RPC client for virus checking responsive to an open file request from a client.

With reference to FIG. 6, there is shown a flowchart of a subroutine of the RPC client for virus checking responsive to an open file request from a network client. This subroutine is called in the modified UxFS in lieu of the UxFS subroutine originally called in order to open a file for a network client. In a first step 70, a filter is applied to the file extension of the file to be opened. The filter may also ensure that files larger than a certain configurable limit are not checked for viruses. Typically the filter is a list of file extensions for all executable file types, so that the file extension for any executable file will meet the criteria of the filter. For example, the filter is configurable with a command such as:

masks=*.EXE:*.COM:*.XL?, which instructs the RPC client to initiate scanning of only files ending in .EXE, .COM, .XLT, .XLS etc. If the file extension does not meet the criteria of the filter, then the file will not be checked for viruses, and execution branches to step 71 to open the file for requesting process, and the routine is finished.

If the file extension meets the criteria of the filter, then execution continues from step 70 to step 72. In step 72, the RPC client inspects the file attributes to determine whether the file is marked as ok. If so, then execution branches to step 71. If in step 72 the file is not marked as ok, execution continues to step 73. In step 73, the RPC client checks whether the process requesting the opening of the file is a privileged process. For example, the conventional virus checker program in the NT file server and the RPC server for virus checking on the NT file server are such privileged processes. These privileged processes have full access to the file being scanned to be able to rename, rename extension, quarantine/move, and delete, repair, or modify the file. At the same time, accesses of other clients to the file are blocked. For a privileged process, execution branches from step 73 to step 71 to open the file for the requesting process, and the routine is finished. In this fashion, the opening of a file in the network file server by the virus checker in the NT file server does not cause an infinite indirect recursive loop.

If in step 73 the process requesting the opening of the file is not a privileged process, execution continues to step 74. In step 74, execution branches to step 75 if the file is already being checked for viruses. This prevents multiple concurrent invocations of virus checking upon the same file. In step 75 a timer is set with a configurable value indicative of a maximum amount of time that should be required for anti-virus scanning of the file. Execution continues from step 75 to step 76 to suspend and then resume execution of the subroutine, in order to spend some time waiting for the checking of the file to complete. If in step 77 the checking of the file is still ongoing, execution continues to step 78. In step 78, the timer is checked to determine whether an unreasonable amount of time has elapsed. If so, then the subroutine may return an error code to the requesting process, indicating that the opening of the file has been blocked by the virus checking. If the client is requesting a read access of the file, the RPC client could report the error to the system administrator, and then allow access to the file by branching to step 71. This is a design choice as to whether the cost of blocking a client's access to the file is greater than the cost of accessing a potentially infected file.

In step 78, if an unreasonable amount of time has not elapsed, execution loops back from step 78 to step 76 to continue checking of the file. If in step 77 the checking of the file is finished, then execution branches to step 79. In step 79, the file attributes are inspected to determine whether the checking of the file has succeeded. If the file is marked as ok, then execution branches to step 72 to open the file for the requesting process. Otherwise, execution returns with an error code indicating that the file has not been opened because the file is infected.

If in step 74 the file was not being checked, then execution continues to step 80. In step 80, the file attributes are inspected to determine whether the file is infected. If so, then execution returns with an error code indicating that the file will not be opened because it is infected. Otherwise, execution continues from step 80 to step 81. In step 81, the subroutine of FIG. 6 calls the RPC client subroutine of FIG. 5 for anti-virus scanning of the file. Then execution continues to step 82. If the scan was successful, then execution branches to step 72 to open the file for the requesting process, and the routine is done. Otherwise, if the scan was not successful, then the subroutine of FIG. 6 is finished, and it returns an error code indicating that the file will not be opened because the file is infected.

Figure 7:
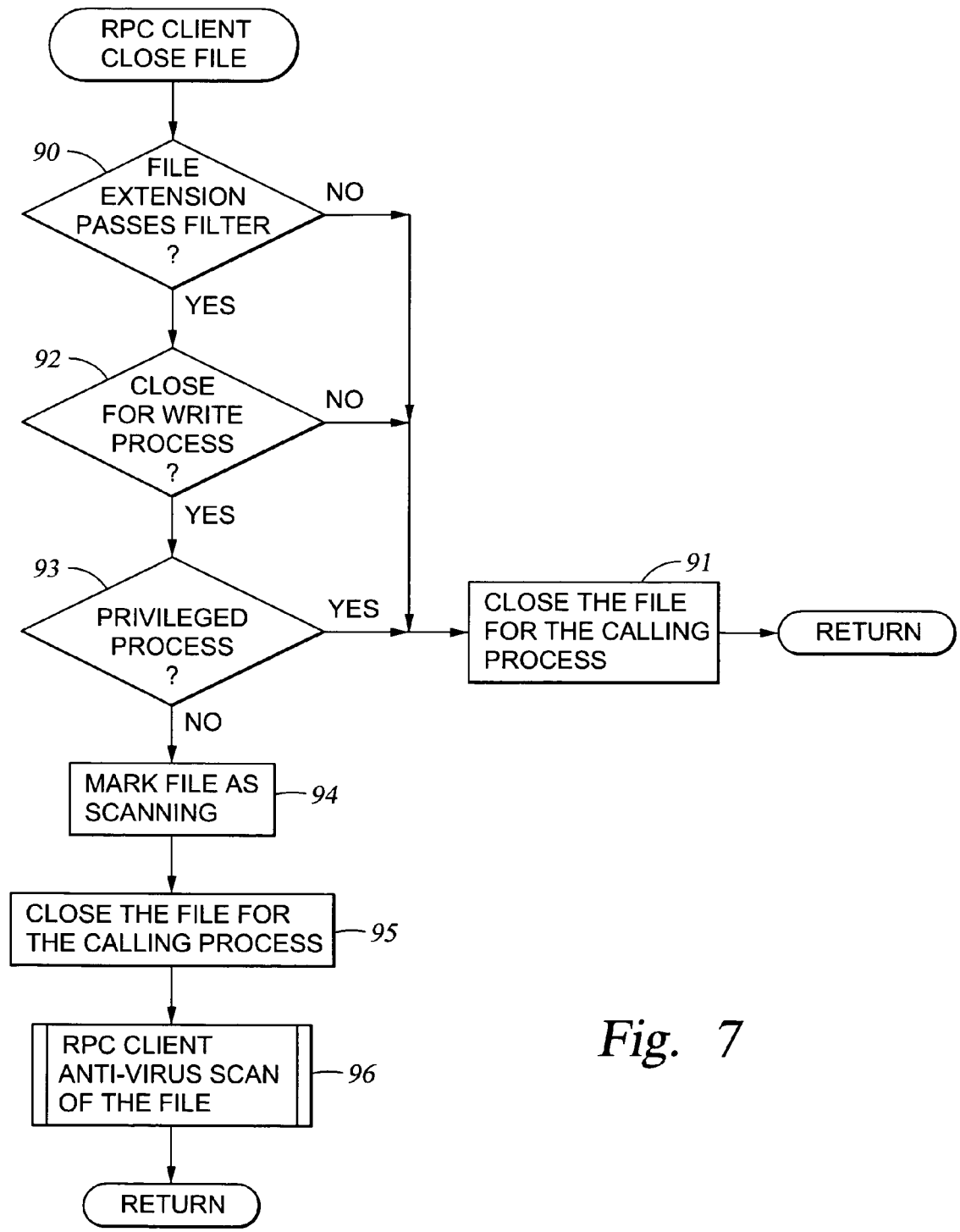
FIG. 7 is a flowchart of a subroutine in the RPC client for virus checking responsive to a close file request from a client.

FIG. 7 shows the procedure followed by the RPC client when a client process requests a file to be closed. In a first step 90, the file extension filter is applied to the file extension. If the file extension does not meet the criteria of the filter, then it will not be subjected to an anti-virus scan, and execution branches to step 91. In step 91, the RPC client closes the file for the calling process, and the routine is finished.

If the file extension meets the criteria of the file extension filter, then execution continues from step 90 to step 92. In step 92, execution branches to step 91 if the process closing the file has not written to or modified the file. Otherwise, execution continues from step 92 to step 93. In step 93, if the process requesting the closing of the file is a privileged process, then execution branches to step 91 to close the file. For example, an invocation of the virus checker in the NT file server is such a privileged process. Otherwise, execution continues from step 93 to step 94. In step 94, the file is marked by setting the file attributes to indicate that the file is undergoing virus checking. Execution continues from step 94 to step 95. In step 95 the file is closed for the calling process. The file is marked for scanning in step 94 prior to closing of the file in step 95 so that in the event of a crash just after the closing of the file, the interrupted scanning can be completed during a recovery operation. In step 96 the routine calls the RPC client subroutine for an anti-virus scan of the file, as shown in FIG. 5. In this case, the preferred entry point is step 62 in FIG. 5, because step 61 has already been performed in step 94 of FIG. 7. Upon return from the subroutine in FIG. 5, the routine of FIG. 7 is finished.

The RPC client for virus checking could check a file in response to additional events, such as when a file is renamed, and when a link to a file is created. Checking in response to these additional events is advantageous when the filtering of step 70 in FIG. 6 and 90 in FIG. 7 are based on file extension, because the renaming or creation of the link might otherwise defeat the intent of the filter.

Figure 8:
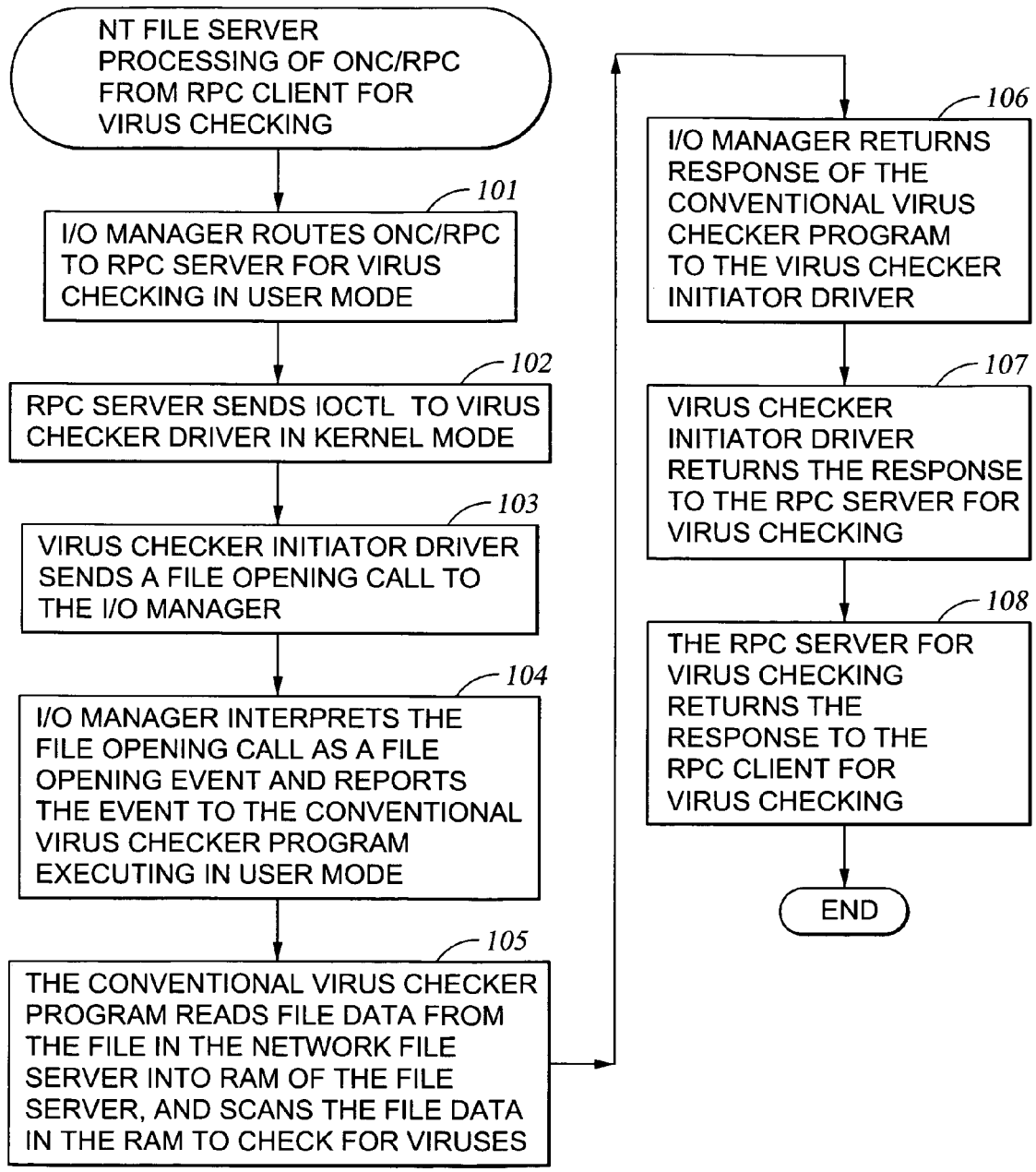
FIG. 8 is a flowchart of the processing of a request from the RPC client in FIG. 2 to the NT file server of FIG. 3 for virus checking of a specified file in the network file server of FIG. 2.

FIG. 8 shows a flowchart of the procedure performed by the NT file server when processing and ONC/RPC from the RPC client for virus checking. This procedure was introduced above with reference to FIG. 3. In the first step 101 the I/O manager routes the ONC/RPC to the RPC server for virus checking, which executes in user mode of the Windows NT/2000 operating system. Then in step 102, the RPC server sends the IOCTL and file path specification to the virus checker initiator driver executing in the kernel mode. In step 103 the virus checker initiator driver sends a file opening call including the file path specification to the I/O manager. In step 104 the I/O manager interprets the file opening call as a file opening event and reports the event to the conventional virus checker program, which is executing in user mode. In step 105 the conventional virus checker program reads file data from the file in the network file server into random access memory of the NT file server, scans the file data in the random access memory to check for viruses, and returns a response, such as a condition code, to the I/O manager. Then in step 106 the I/O manager returns the response of the conventional virus checker program to the virus checker initiator driver. In step 107 the virus checker initiator driver returns the response to the RPC server for virus checking. Finally, in step 108, the RPC server for virus checking returns the response to the RPC client for virus checking, and the routine is finished.

Figure 9:
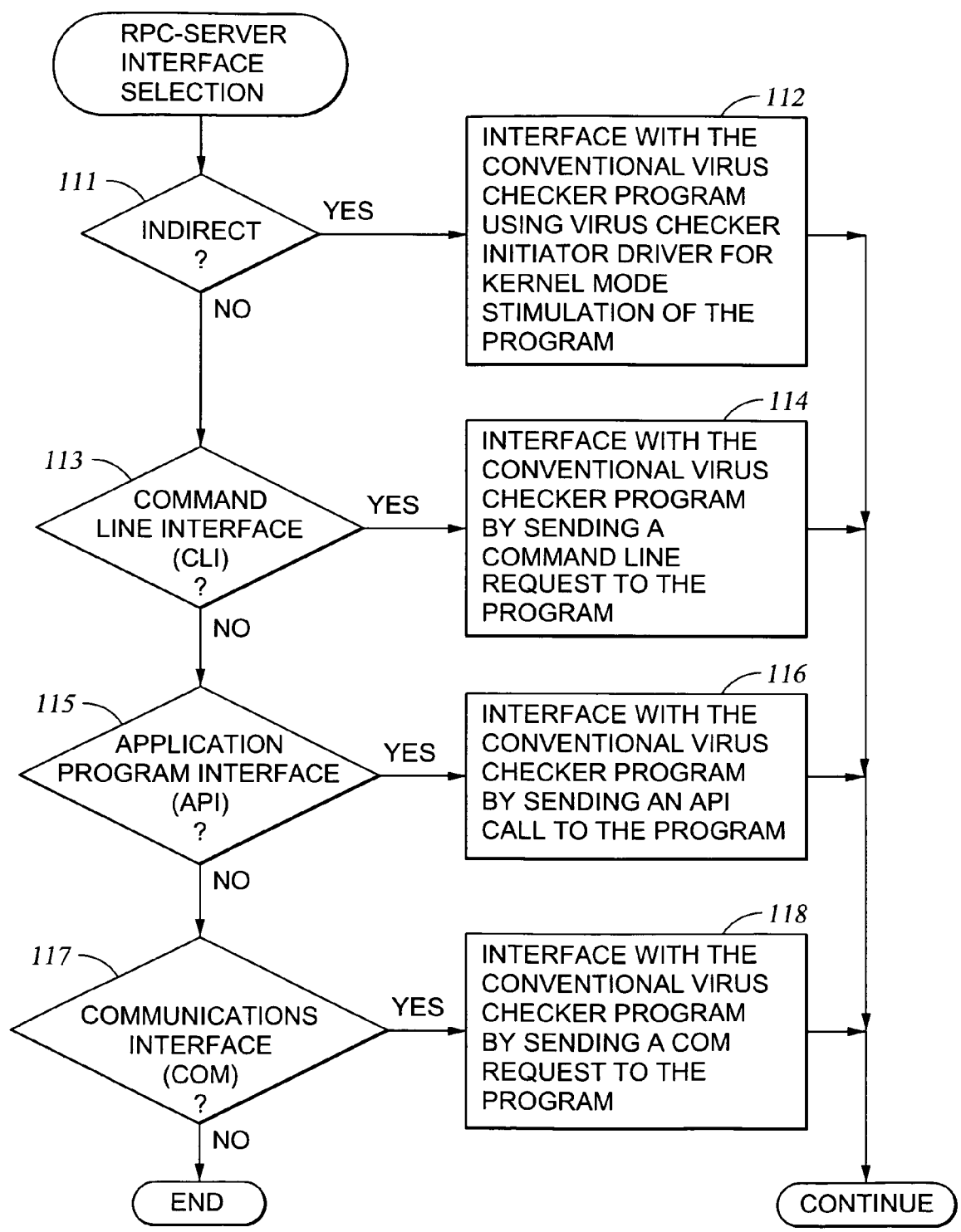
FIG. 9 is a flowchart of a procedure in the RPC server for virus checking in the NT file server of FIG. 3 for interfacing the RPC server with the conventional virus checker program in the NT file server.

In a preferred implementation, the RPC server for virus checking is multithreaded and supports NT registry configurable parameters that set and affect how the server behaves in order to support and interface to many different kinds of conventional virus checker programs. For example, a configurable interface selection parameter is interpreted as shown in FIG. 9. The interface selection parameter specifies either indirect, command line interface (CLI), application program interface (API), or communications interface (COM). For the interface parameter set to "indirect," as tested in step 111, the RPC server uses the virus checker initiator driver for kernel-mode stimulation of the conventional virus checker program, as shown in step 112. This is the preferred interface method, because it can work with a wide variety of conventional virus checker programs and it is the most insensitive to any downward compatible upgrading of the virus checker program. For example, the same virus checking driver for the Windows NT/2000 operating system can support the NAI/McAfee's NetShield 4.5 for NT Server, Symantec Norton AntiVirus 7.5 Corporate Edition for Windows NT, and Trend Micro's ServerProtect 5.5 for Windows NT server. For the interface parameter set to "CLI," as tested in step 113, the RPC server sends a command line request to the conventional virus checker program to initiate an anti-virus scan, as shown in step 114. The CLI method can be used to interface with the McAfee's VirusScan program. For the interface parameter set to "API," as tested in step 115, the RPC server sends an API call to the conventional virus checker program to initiate an anti-virus scan, as shown in step 116. The API method can be used to interface with Trend Micro's VSAPI program, or Symantec's CarrierScan program. Finally, with the interface parameter set to "COM," as tested in step 117, the RPC server sends a COM request to the conventional virus checker program to initiate an anti-virus scan, as shown in step 118.

The protocol between the virus checker client in the network file server and the virus checker server in the NT file server could also be configurable for a protocol other than ONC/RPC. Moreover, the commands sent from the RPC client for virus checking to the RPC server for virus checking could include a "checking type" parameter to support file checking functionality other that virus checking, such as content checking of a file.

Figure 10:
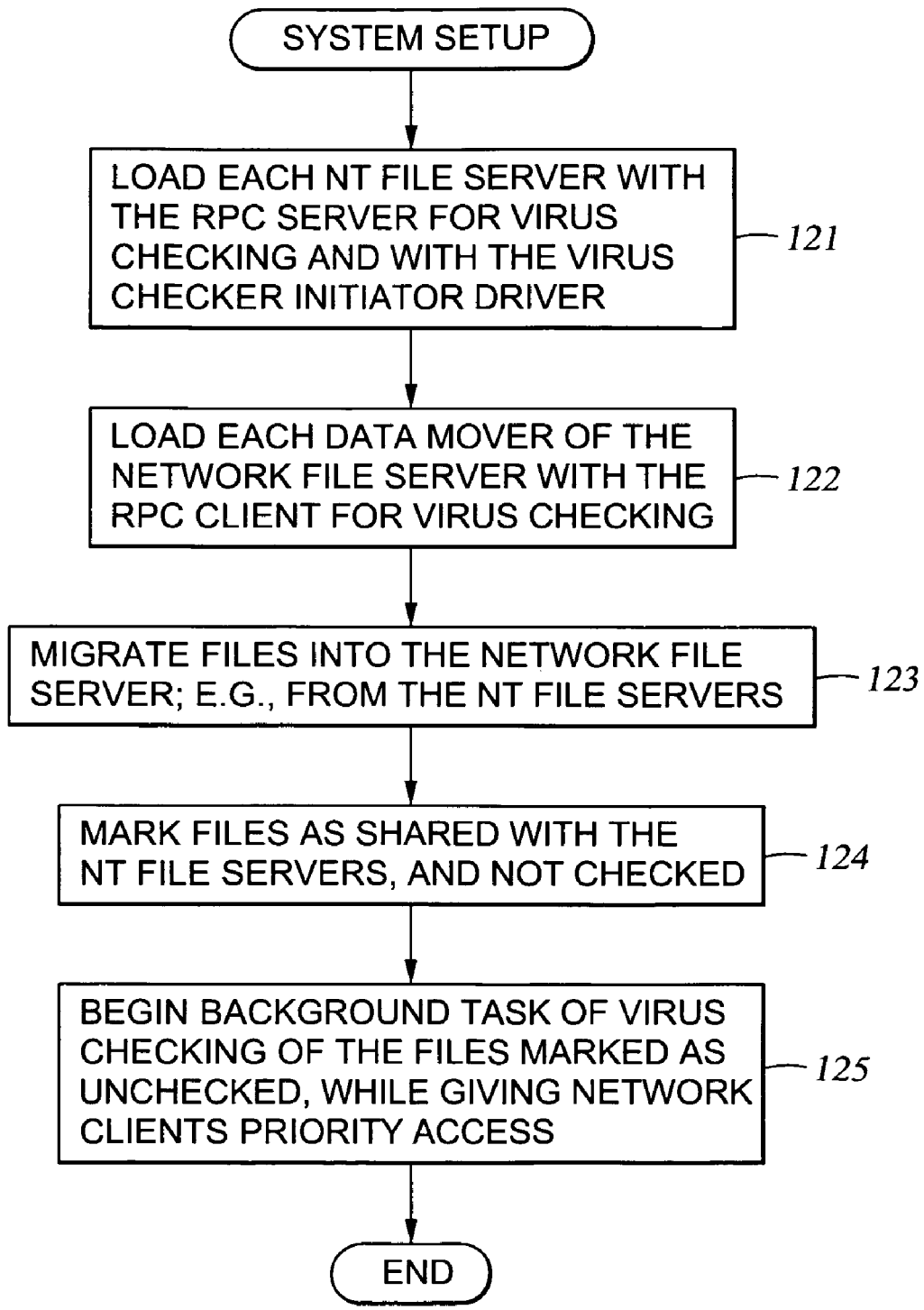
FIG. 10 is a flowchart of a procedure for installing the network file server into the data processing system of FIG. 1.

FIG. 10 shows a flow chart of a procedure for installing the network file server (27 in FIG. 1) into the data processing system of FIG. 1. In a first step 121, each NT file server is loaded with the RPC server for virus checking and with the virus checker initiator driver. Then in step 122 each data mover of the network file server is loaded with the RPC client for virus checking. In step 123 files are migrated to the network file server, for example, from the NT file servers. In step 124 the files in the network file server are marked as shared with the NT file servers, and are initially marked as "not checked". Then in step 125, the data movers of the network file server begin a background task of virus checking of the files marked as unchecked, while giving network clients priority access.

In a preferred implementation, the network file server is set up by the following commands. In a boot.cfg file on the data mover, the only command is "check start". This command starts the RPC client for virus checking on the data movers.

In a /.etc/viruschecker.conf file on the data mover, the following configuration parameters are stored: 'masks=<list of filename extensions>' sets the list of filemasks that need to be checked; 'addr=<list of IP addresses>' sets the IP addresses of the NT servers including the virus checker programs that are to be used with the data mover; 'CIFSserver=<name of the RPC server>' sets the name of the RPC server for virus checking in the data mover; and 'maxsize=xxxx (32 bits)' sets the maximum file size that will be checked.

A specific example is the following:
    masks=*.EXE:*.COM:*.DOC:*.DOT:*.XL?:*.MD?:
*.VXD:*.386:*.SYS:*.BIN
    masks=*.RTF:*.OBD:*.DLL:*.SCR:*.OBT:*.PP?:
*.POT:*.OLE:*.SHS:*.MPP
    masks=*.MPT:*.XTP:*.XLB:*.CMD:*.OVL:*.DEV
    masks=*.ZIP:*.TAR:*.ARJ:*ARC:*.Z
    addr=168.159.173.239

In the preferred embodiment, the data mover is also responsive to a number of check commands. These check commands include:

1. 'check start'—starts the RPC client for virus checking on the data mover and connects to the listed RPC server for virus checking;
2. 'check stop'—stops the RPC client for virus checking on the data mover;
3. 'check'—displays the configuration of the RPC client for virus checking;
4. 'check audit'—displays the status of the RPC client for virus checking; and
5. 'param check Traces=n'—displays a trace output of virus checking on the operator's console ('TRACES=4' provides a trace of invocations of the virus checker program from the RPC servers, 'TRACES=2' provides a trace of the RPC messages between the RPC client and the RPC server, and 'TRACES=1' provides a trace of calls in the data mover to the RPC client).

Often it will be found that the virus checker program is incapable of detecting a new virus. In this case, the supplier of the anti-virus program will distribute an updated pattern file that may be used by the conventional virus checker program to detect the new virus. In such a case, all of the files in the network file server can be marked as unchecked, and then step 115 can be repeated in order to check all of the files using the updated pattern file.

Following the specification and preceding the claims is a listing of source code for the RPC driver for virus checking.

In view of the above, there has been described a method of using a conventional virus checker program in one network file server to check for viruses when files in another network file server are accessed by network clients. In the preferred implementation, when a network client accesses a file in a network file server using a specialized operating system, the network file server invokes a conventional virus checker program in an NT file server to transfer pertinent file data from the network file server to random access memory in the NT file server, and to perform an anti-virus scan of the file data in the random access memory of the NT file server. The conventional virus checker program then returns a condition code to the network file server to indicate whether or not the file was found to be infected, although the conventional virus checker program also implements its conventional action policy when the file is found to be infected. In other words, the method retains the normal functionality provided by the conventional virus checker program. Therefore, users can still interact with the conventional virus checker program in the usual fashion, for example through a graphical interface provided by the virus checker program for selecting the file types that should be checked, and the actions that should be taken when a file of a specified type is found to be infected. Because the conventional virus checker program is not loaded or executed in the network file server, there is no need for porting the virus checker program to the specialized operating system of the network file server, nor is there any need for maintenance in the network file server when the conventional virus checker program is updated with a new virus pattern file or upgraded.

Moreover, in the preferred implementation, there is an indirect interface in the NT file server between the commands from the network file server for initiating a virus scan and the conventional virus checker program. This indirect interface operates in the kernel mode to report a file opening event to the I/O manager, which notifies the conventional virus checker program. In this fashion, the indirect interface supports a wide variety of conventional virus checker programs, and ensures that the interface will continue to operate properly with any downward compatible upgrade of the conventional virus checker program.

What is claimed is:

1. In a data processing system including at least one client, a first file server coupled to the client for data access of the client to at least one file in the first file server, and at least a second file server coupled to the first file server for data access of the second file server to the file in the first file server, the second file server being programmed with a virus checker program, the virus checker program being executable by the second file server to perform an anti-virus scan upon file data in random access memory of the second file server, a method compnsing:
    the first file server responding to a request from the client for access to the file in the first file server by determining that an anti-virus scan of the file should be performed, and initiating the anti-virus scan of the file by sending to the second file server a request for the anti-virus scan including a specification of the file, and then
    the second file server responding to the request for the anti-virus scan by invoking the virus checker program to perform an anti-virus scan of the specified file by obtaining file data of the file from the first file server and storing the file data of the file into the random access memory of the second file server and performing the anti-virus scan upon the file data of the file in the random access memory.

2. The method as claimed in claim 1, wherein the first file server determines that the anti-virus scan of the file should be performed when the client requests the first file server to open the file and the first file server finds that the file has not been checked for viruses.

3. The method as claimed in claim 1, wherein the first file server determines that the anti-virus scan of the file should be performed when the client requests a file to be closed after the client writes to the file.

4. The method as claimed in claim 1, wherein the first file server applies a filter to a file extension of the file to determine that the anti-virus scan of the file should be performed.

5. The method as claimed in claim 1, wherein the first file server blocks clients from accessing the file from the time that the first file server determines that the anti-virus scan of the file should be performed until the anti-virus scan is completed and fails to find a virus in the file.

6. The method as claimed in claim 1, wherein the first file server determines that an additional anti-virus scan of the file should not be performed in response to the access of the file by the virus checker program.

7. The method as claimed in claim 1, wherein the first file server maintains in nonvolatile memory an indication of files that have not been checked for viruses, an indication of files that are in the process of being checked, and an indication of files that have been found to contain viruses.

8. The method as claimed in claim 1, wherein the request for the anti-virus scan including a specification of the file is an Open Network Computing Remote Procedure Call.

9. The method as claimed in claim 1, wherein the second file server receives the request for the anti-virus scan and indirectly invokes the virus checker program by reporting a file access event to an operating system of the second file server, and the operating system of the second file server responds by invoking the virus checker program to perform the anti-virus scan of the file.

10. The method as claimed in claim 1, wherein the operating system of the second file server supports processes executing in a user mode and processes executing in a kernel mode, and a server for virus checking executing in the user mode receives the request for the anti-virus scan from the first file server and forwards the request to a virus checker initiator driver executing in the kernel mode, and the virus checker initiator driver executing in the kernel mode initiates a file access event, and the virus checker program initiates the anti-virus scan of the file in response to the virus checker initiator driver initiating the file access event.

11. The method as claimed in claim 10, wherein an input/output manager in the operating system of the second file server receives a file access call from the virus checker initiator driver, and responds by directing a report of the file access event to the virus checker program.

12. The method as claimed in claim 1, wherein the data processing system includes at least a third file server coupled to the first file server for data access of the third file server to the file in the first file server, the third file server also being programmed with a virus checker program that is executable by the third file server to perform an anti-virus scan upon file data in random access memory of the third file server, wherein the first file server performs a load balancing procedure to select one of at least the second file server or the third file server to perform an anti-virus scan of the file when the first file server determines that an anti-virus scan of the file should be performed.

13. A method of operating a network file server to initiate a virus scan upon a file stored in the network file server, the network file server being coupled to at least one client for access of the client to at least one file in the network file server, the network file server being coupled to a plurality of secondary servers for access of the secondary servers to the file stored in the network file server, the network file server including a cached disk array and a plurality of data mover computers coupled to the data network and coupled to the cached disk array for responding to client requests for data access to storage in the cached disk array, each secondary server being programmed with a virus checker program executable for performing an anti-virus scan upon file data in random access memory of said each secondary server, a method comprising:

at least one of the data movers in the network file server responding to a request from the client for access to the file in the network file server by applying a filter upon a file extension of the file upon opening or closing of the file to determine that an anti-virus scan of the file should be performed, and initiating the anti-virus scan of the file by applying a load balancing procedure for selecting one of the secondary servers for performing the anti-virus scan of the file, and sending to the selected secondary server a request for the anti-virus scan including a specification of the file, and then the selected secondary server responding to the request for the anti-virus scan by invoking the virus checker program in the selected secondary server to perform an anti-virus scan of the specified file by obtaining file data of the file from the network file server and storing the file data of the file into the random access memory of the selected secondary server and performing the anti-virus scan upon the file data of the file in the random access memory of the selected secondary server.

14. The method as claimed in claim 13, wherein the file is an executable file, and the network file server determines that the anti-virus scan of the file should be performed when the client requests the network file server to open the file and the network file server finds that the file has not been checked for viruses, and the network file server also determines that the anti-virus scan of the file should be performed when the client requests the file to be closed after the client writes to the file.

15. The method as claimed in claim 13, wherein the selected secondary server receives the request for the anti-virus scan and indirectly invokes the virus checker program by causing an operating system of the selected secondary server to invoke the virus checker program in the selected secondary server to perform the anti-virus scan of the file.

16. In a data network including a first server and a second server, the second server being coupled by a data network to the first server for access of the second server to at least one file stored in the first server, wherein the second server is programmed with an operating system supporting processes executing in a user mode and processes executing in a kernel mode, the operating system of the second server including an input/output manager executing in the kernel mode, a method of operating the second server to perform an anti-virus scan upon the file in the first server, said method comprising:

a server for virus checking executing in the second server in the user mode receives from the network a request for the anti-virus scan upon the file, and then the server for virus checking forwards the request to a virus checker initiator driver executing in the second server in the kernel mode, and the virus checker initiator driver responds to receipt of the request by sending a file access call to the input/output manager, and then the input/output manager responds to the file access call by directing a report of a file access event to a virus checker program executing in the second server in the user mode, and the virus checker program responds by obtaining file data from the file in the first server and storing the file data in random access memory in the second server, and performing an anti-virus scan upon the file data in the random access memory in the second server.

17. In a data processing system including at least one client, at least one network file server coupled to the client by a data network for access of the client to at least one file in the network file server, and a plurality of NT file servers coupled to the network file server by the data network for data access of the NT file servers to the file in the network file server, the network file server including a cached disk array and a plurality of data mover computers coupled to the data network and coupled to the cached disk array for responding to client requests for data access to storage in the cached disk array, each of the NT file servers being programmed with a virus checker program, the virus checker program in each NT file server being executable by said each NT file server to perform an anti-virus scan upon file data in random access memory of said each NT file server, a method comprising:

a data mover in the network file server responding to a request from the client for access to the file in the network file server by applying a filter upon a file extension of the file upon opening or closing of the file to determine that an anti-virus scan of the file should be performed, and initiating the anti-virus scan of the file by selecting a next one of the NT file servers in round-robin fashion and sending to the selected NT file server a request for the anti-virus scan including a specification of the file, and then the selected NT file server responding to the request for the anti-virus scan by invoking the virus checker program in the selected NT file server to perform an anti-virus scan of the specified file by obtaining file data of the file from the network file server and storing the file data of the file in the random access memory of the selected NT file server and performing the anti-virus scan upon the file data of the file in the random access memory of the selected NT file server.

18. The method as claimed in claim 17, wherein the file is an executable file and the network file server determines that the anti-virus scan of the file should be performed when the client requests the network file server to open the file and the network file server finds that the file has not been checked for viruses, and the network file server also determines that the anti-virus scan of the file should be performed when the client requests the file to be closed after the client writes to the file.

19. The method as claimed in claim 17, wherein the operating system of the selected NT file server supports processes executing in a user mode and processes executing in a kernel mode, a server for virus checking executing in the user mode receives the request for the anti-virus scan from the network file server and forwards the request to a virus checker initiator driver executing in the kernel mode, the virus checker initiator driver executing in the kernel mode sends a file access call to an input/output manager in the operating system of the selected NT file server, the input/output manager responds to the file access call by directing a report of a file access event to the virus checker program in the selected NT file server, and the virus checker program in the selected NT file server initiates the anti-virus scan of the file in response to receiving the report of the file access event from the input/output manager.

20. A data processing system comprising:
at least one client;
a first file server coupled to the client for access of the client to at least one file in the first file server; and
at least a second file server coupled to the first file server for data access of the second file server to the file in the first file server, the second file server being programmed with a virus checker program, the virus checker program being executable by the second file server to perform an anti-virus scan upon file data in random access memory of the second file server;
wherein the first file server is programmed to respond to a request from the client for access to the file in the first file server by determining that an anti-virus scan of the file should be performed, and initiating the anti-virus scan of the file by sending to the second file server a request for the anti-virus scan including a specification of the file; and
the second file server is programmed to respond to the request for the anti-virus scan by invoking the virus checker program to perform an anti-virus scan of the specified file by obtaining file data of the file from the first file server and storing the file data of the file in the random access memory of the second file server and performing the anti-virus scan upon the file data in the random access memory.

21. The data processing system as claimed in claim 20, wherein the first file server is programmed to determine that the anti-virus scan of the file should be performed when the client requests the first file server to open the file and the first file server finds that the file has not been checked for viruses.

22. The data processing system as claimed in claim 20, wherein the first file server is programmed to determine that the anti-virus scan of the file should be performed when the client requests a file to be closed after the client writes to the file.

23. The data processing system as claimed in claim 20, wherein the first file server is programmed to apply a filter to a file extension of the file to determine that the anti-virus scan of the file should be performed.

24. The data processing system as claimed in claim 20, wherein the first file server is programmed to block clients from accessing the file from the time that the first file server determines that the anti-virus scan of the file should be performed until the anti-virus scan is completed and fails to find a virus in the file.

25. The data processing system as claimed in claim 20, wherein the first file server is programmed to determine that an additional anti-virus scan of the file should not be performed in response to the access of the file by the virus checker program.

26. The data processing system as claimed in claim 20, wherein the first file server is programmed to maintain in nonvolatile memory an indication of files that have not been checked for viruses, an indication of files that are in the process of being checked, and an indication of files that have been found to contain viruses.

27. The data processing system as claimed in claim 20, wherein the request for the anti-virus scan including a specification of the file is an Open Network Computing Remote Procedure Call.

28. The data processing system as claimed in claim 20, wherein the second file server is programmed to receive the request for the anti-virus scan and indirectly invoke the virus checker program by causing an operating system of the second file server to invoke the virus checker program to perform the anti-virus scan of the file.

29. The data processing system as claimed in claim 20, wherein the operating system of the second file server supports processes executing in a user mode and processes executing in a kernel mode, and the second file server includes a server for virus checking that is executable in the user mode and a virus checker initiator driver that is executable in the kernel mode, the server for virus checking being executable for receiving the request for the anti-virus scan from the first file server and forwarding the request to the virus checker initiator driver, and the virus checker initiator driver is executable for causing the operating system reporting a file access event to the virus checker program, and the virus checker program is executable for initiating the anti-virus scan of the file in response to the report of the file access event.

30. The data processing system as claimed in claim 29, wherein the operating system of the second file server includes an input/output manager that is executable in the kernel mode for receiving a file access call from the virus checker initiator driver, and responding to the file access call by directing the report of the file access event to the virus checker program.

31. The data processing system as claimed in claim 20, which further includes at least a third file server coupled to the first file server for data access of the third file server to the file in the first file server, the third file server also being programmed with a virus checker program that is executable by the third file server to perform an anti-virus scan upon file data in random access memory of the third file server, and wherein the first file server is programmed for performing a load balancing procedure to select one of at least the second file server or the third file server to perform an anti-virus scan of the file when the first file server determines that an anti-virus scan of the file should be performed.

32. A network file server adapted for coupling to at least one client for access of the client to at least one file in the network file server, the network file server also being adapted for coupling to a plurality of secondary servers for access of the secondary servers to the file stored in the network file server, each secondary server being programmed with a virus checker program executable for transferring file data from the file in the network file server to random access memory in said each secondary server, and performing an anti-virus scan upon the file data in the random access memory of said each secondary server, the network file server comprising:

a cached disk array; and a plurality of data mover computers coupled to the data network and coupled to the cached disk array for responding to client requests for data access to storage in the cached disk array, wherein at least one of the data movers is programmed to respond to a request from the client for access to the file in the network file server by applying a filter upon a file extension of the file upon opening or closing of the file to determine that an anti-virus scan of the file should be performed, and initiating the anti-virus scan of the file by applying a load balancing procedure for selecting one of the secondary servers for performing the anti-virus scan of the file, and sending to the selected secondary server a request for the anti-virus scan including a specification of the file.

33. The data processing system as claimed in claim 32, wherein the file is executable and the network file server is programmed to determine that an anti-virus scan of the file should be performed when the client requests the network file server to open the file and the network file server finds that the file has not been checked for viruses, and the network file server is also programmed to determine that the anti-virus scan of the file should be performed when the client requests the file to be closed after the client writes to the file.

34. A secondary server adapted for coupling to a primary server in a data network for access to data in files in the primary server, wherein the secondary server is programmed with an operating system supporting processes executing in a user mode and processes executing in a kernel mode, the operating system including an input/output manager executable in the kernel mode, wherein the secondary server is further programmed with:

a server for virus checking executable in the user mode;

a virus checking driver executable in the kernel mode; and a virus checker program executable in the user mode;

wherein the server for virus checking is executable for receiving from the network a request for an anti-virus scan upon a specified file in the primary server, and for forwarding the request to the virus checker initiator driver;

wherein the virus checker initiator driver is executable for responding to receipt of the request from the server for virus checking by sending a file access call upon the specified file to the input/output manager;

wherein the input/output manager is executable for responding to the file access call by directing a report of a file access event upon the specified file to the virus checker program; and wherein the virus checker program is executable for responding to the report of the file access event by transferring file data from the specified file in the primary server to random access memory in the secondary server, and performing an anti-virus scan upon the file data in the random access memory in the secondary server.

35. A data processing system comprising:

at least one client;

at least one network file server coupled to the client by a data network for access of the client to at least one file in the network file server; and a plurality of NT file servers coupled to the network file server by the data network for data access of the NT file servers to the file in the network file server;

wherein the network file server includes a cached disk array and a plurality of data mover computers coupled to the data network and coupled to the cached disk array for responding to client requests for data access to storage in the cached disk array;

wherein each of the NT file servers is programmed with a virus checker program, the virus checker program being executable by said each NT file server to perform an anti-virus scan upon file data in random access memory of said each NT file server;

wherein at least one data mover in the network file server is programmed for responding to a request from the client for access to the file in the network file server by applying a filter upon a file extension of the file upon opening or closing of the file to determine that an anti-virus scan of the file should be performed, and initiating the anti-virus scan of the file by selecting a next one of the NT file servers in round-robin fashion and sending to the selected NT file server a request for the anti-virus scan including a specification of the file, and wherein each NT file server is programmed to respond to the request for the anti-virus scan by invoking the virus checker program in said each NT file server to perform an anti-virus scan of the specified file by obtaining file data of the specified file from the network file server and storing the file data of the specified file in the random access memory of said each NT file server and performing the anti-virus scan upon the file data of the specified file in the random access memory of said each NT file server.

36. The data processing system as claimed in claim 35, wherein the file is an executable file, and the network file server is programmed for determining that the anti-virus scan of the file should be performed when the client requests the network file server to open the file and the network file server finds that the file has not been checked for viruses, and the network file server also determines that the anti-virus scan of the file should be performed when the client requests the file to be closed after the client writes to the file.

37. The data processing system as claimed in claim 35, wherein the selected NT file server is programmed with:

an operating system supporting processes executing in a user mode and processes executing in a kernel mode, the operating system including an input/output manager executable in the kernel mode;

a server for virus checking executable in the user mode; and a virus checker initiator driver executable in the kernel mode;

wherein the server for virus checking is executable for receiving the request for the anti-virus scan from the network file server and forwarding the request to the virus checker initiator driver;

wherein the virus checker initiator driver is executable for responding to the request from the server for virus checking by sending a file access call to the input/output manager;

wherein the input/output manager is executable for responding to the file access call by directing a report of a file access event to the virus checker program in the selected NT file server; and wherein the virus checker program in the selected NT file server is executable for performing the anti-virus scan of the file in response to receiving the report of the file access event from the input/output manager.

38. A program storage device containing a program executable by a network file server, the network file server being adapted for coupling to at least one client for access of the client to at least one file in the network file server, the network file server also being adapted for coupling to a plurality of secondary servers for access of the secondary servers to the file stored in the network file server, each secondary server being programmed with a virus checker program executable for transferring file data from the file in the network file server to random access memory in said each secondary server, and performing an anti-virus scan upon the file data in the random access memory of said each secondary server, the program contained in the program storage device being executable by the network file server for responding to a request from the client for access to the file in the network file server by applying a filter upon a file extension of the file upon opening or closing of the file to determine that an anti-virus scan of the file should be performed, and initiating the anti-virus scan of the file by applying a load balancing procedure for selecting one of the secondary servers for performing the anti-virus scan of the file, and sending to the selected secondary server a request for the anti-virus scan including a specification of the file.

39. The program storage device as claimed in claim 38, wherein the file is an executable file, and the program contained in the program storage device is also executable by the network file server for determining that an anti-virus scan of the file should be performed when the client requests the network file server to open the file and the network file server finds that the file has not been checked for viruses, and the program contained in the program storage device is also executable by the network file server for determining that the anti-virus scan of the file should be performed when the client requests the file to be closed after the client writes to the file.

40. A program storage device containing a program executable by a secondary server, the secondary server being adapted for coupling to a primary server in a data network for access to data in files in the primary server, wherein the secondary server is programmable with an operating system supporting processes executing in a user mode and processes executing in a kernel mode, the operating system including an input/output manager executable in the kernel mode, and the secondary server is also programmable with a virus checker program for performing an anti-virus scan upon file data in response to a file opening event being reported to the input/output manager, wherein the program contained in the program storage device includes:

a server for virus checking executable in the user mode; and a virus checking driver executable in the kernel mode;

wherein the server for virus checking is executable for receiving from the network a request for the anti-virus scan upon a specified file in the primary server, and for forwarding the request to the virus checker initiator driver; and wherein the virus checker initiator driver is executable for responding to receipt of the request from the server for virus checking by sending a file access call upon the specified file to the input/output manager, whereby the input/output manager directs a report of a file access event upon the specified file to the virus checker program to initiate an anti-virus scan upon file data of the specified file.

* * * * *

UNITED STATES PATENT AND TRADEMARK OFFICE
CERTIFICATE OF CORRECTION

| | |
|---|---|
| PATENT NO. | : 7,363,657 B2 |
| APPLICATION NO. | : 09/804320 |
| DATED | : April 22, 2008 |
| INVENTOR(S) | : Frank S. Caccavale |

It is certified that error appears in the above-identified patent and that said Letters Patent is hereby corrected as shown below:

In Claim 1, Col. 16, line 22, "compnsing" is changed to --comprising--.

Signed and Sealed this

Twenty-ninth Day of July, 2008

JON W. DUDAS
*Director of the United States Patent and Trademark Office*